United States Patent
Itoga et al.

(10) Patent No.: US 10,429,231 B2
(45) Date of Patent: Oct. 1, 2019

(54) FLOWMETER TEST SYSTEM AND FLOWMETER TEST METHOD

(71) Applicant: HORIBA, Ltd., Kyoto (JP)

(72) Inventors: Yuki Itoga, Kyoto (JP); Jun Tomita, Kyoto (JP)

(73) Assignee: HORIBA, LTD., Kyoto (JP)

( * ) Notice: Subject to any disclaimer, the term of this patent is extended or adjusted under 35 U.S.C. 154(b) by 94 days.

(21) Appl. No.: 15/636,397

(22) Filed: Jun. 28, 2017

(65) Prior Publication Data

US 2018/0058906 A1 Mar. 1, 2018

(30) Foreign Application Priority Data

Aug. 31, 2016 (JP) ................. 2016-170331

(51) Int. Cl.
*G01F 25/00* (2006.01)
(52) U.S. Cl.
CPC ........ *G01F 25/003* (2013.01); *G01F 25/0046* (2013.01)
(58) Field of Classification Search
CPC ............ G01F 25/003; G01F 25/0046
See application file for complete search history.

(56) References Cited

U.S. PATENT DOCUMENTS

| | | | |
|---|---|---|---|
| 4,823,592 A * | 4/1989 | Hahn ................ | G01F 1/84 73/1.33 |
| 2017/0052056 A1 * | 2/2017 | Yamasaki ........... | G01F 25/0046 |

FOREIGN PATENT DOCUMENTS

| | | |
|---|---|---|
| JP | 2001215144 A | 8/2001 |
| JP | 2014-228361 A | 12/2014 |
| KR | 101154275 B1 | 6/2012 |
| WO | 1992001908 A | 2/1992 |

OTHER PUBLICATIONS

EESR dated Feb. 15, 2018 issued for European Patent Application No. 17 179 733.5.
F. Frenzel, et al., "Industrial Flow Measurement Practice", Jan. 1, 2006, 248 pages, ABB Automation Products GmbH, Gottingen, Germany.

* cited by examiner

*Primary Examiner* — Daniel S Larkin
*Assistant Examiner* — Anthony W Megna Fuentes
(74) *Attorney, Agent, or Firm* — Brooks Kushman P.C.

(57) ABSTRACT

A flowmeter test system that tests a test target flowmeter by flowing fluid through the test target flowmeter and measuring the fluid having flowed through the test target flowmeter by a measurement part different from the test target flowmeter is disclosed. The flowmeter test system includes, a storage part to store the fluid, a distribution flow path to distribute the fluid between the storage part and the test target flowmeter, a measurement part introduction path to be connected to the distribution flow path and introduce the fluid into the measurement part, and a flow path switching part to switch between the distribution flow path and the measurement part introduction path. A pressure loss in a flow path from the flow path switching part to the storage part and a pressure loss in a flow path from the flow path switching part to the measurement part are same.

10 Claims, 8 Drawing Sheets

< FIRST STEP (CIRCULATION FLOW PATH) >

< SECOND STEP (SUB-STORAGE PART INTRODUCTION PATH) >

< THIRD STEP (ELECTRONIC BALANCE INTRODUCTION PATH) >

THICK LINE ( —— ) INDICATES FUEL FLOW.

FLOWMETER TEST SYSTEM AND FLOWMETER TEST METHOD

CROSS-REFERENCE TO RELATED APPLICATION

This application claims priority to JP Application No. 2016-170331, filed Aug. 31, 2016, the disclosure of which is incorporated in its entirety by reference herein.

FIELD OF THE INVENTION

The present invention relates to a flowmeter test system and flowmeter test method that test the accuracy of a flowmeter such as a fuel flowmeter.

BACKGROUND ART

As a conventional flowmeter test system, as disclosed in Patent Literature 1, there is one that tests the accuracy of a test target flowmeter by connecting the test target flowmeter to a circulation path adapted to circulate fuel and flowing a predetermined flow rate of the fluid through the test target flowmeter.

Specifically, the circulation path is connected with a tank for storing the fuel, and on a downstream side of the test target flowmeter and on an upstream side of the tank, a needle valve for flow rate regulation and a reference flowmeter serving as a reference for the test target flowmeter are provided in this order. In addition, between the reference flowmeter and the tank in the circulation path, an electronic balance introduction path for performing flow rate measurement by an electronic balance is connected through a three-way solenoid valve.

Further, in a test using this flowmeter test system, while circulating the fuel through the circulating path, the flow rate of the fuel flowing through the circulation path is regulated by the needle valve, and then the switch to the electronic balance introduction path is made using the three-way solenoid valve. After the switch to the electronic balance introduction path, the flow rate of the fuel having flowed through the test target flowmeter is measured by the reference flowmeter and the electronic balance, and on the basis of measured flow rate values by them, the test target flowmeter is tested.

CITATION LIST

Patent Literature

Patent Literature 1: JP-A 2014-228361

SUMMARY OF INVENTION

Technical Problem

However, a pressure loss occurring when the fuel circulates through the circulation path, and a pressure loss occurring when the fluid flows through the electronic balance introduction path are different, and consequently, the flow rate regulated by the needle valve at the time of the circulation through the circulation path and the flow rate of the fluid supplied to the electronic balance through the electronic balance introduction path are also different.

Specifically, in a transient state such as a state just after switching the three-way solenoid valve, the flow rate of the fluid supplied to the electronic valance varies to cause the difference from the flow rate regulated by the needle valve. As a result, an error occurs in the flow rate measured by the electronic balance, and therefore it becomes difficult to accurately test the accuracy of the test target flowmeter.

The present invention is therefore made in order to solve the above-described problem, and a main object thereof is to accurately test the accuracy of a test target flowmeter.

Solution to Problem

That is, a flowmeter test system according to the present invention is one that tests a test target flowmeter by flowing fluid through the test target flowmeter and measuring the fluid having flowed through the test target flowmeter by a measurement part different from the test target flowmeter, and the flowmeter test system includes: a storage part adapted to store the fluid; a distribution flow path adapted to distribute the fluid between the storage part and the test target flowmeter; a measurement part introduction path adapted to be connected to the distribution flow path and introduce the fluid into the measurement part; and a flow path switching part adapted to switch between the distribution flow path and the measurement part introduction path. In addition, a pressure loss in a flow path from the flow path switching part to the storage part and a pressure loss in a flow path from the flow path switching part to the measurement part are the same.

Here, "a pressure loss in a flow path from the flow path switching part to the storage part and a pressure loss in a flow path from the flow path switching part to the measurement part are the same" also includes, in addition to when the pressure losses are the same, when the pressure losses are substantially the same to the extent of not substantially affecting the test of the test target flowmeter. Also, "when the pressure losses are substantially the same to the extent of not substantially affecting the test of the test target flowmeter" means that for example, the error between the flow rate of the fluid flowing through the flow path from the flow path switching part to the storage part and the flow rate of the fluid flowing through the flow path from the switching part to the measurement part is 0.5% or less.

In such a flowmeter test system, since the pressure loss in the flow path from the flow path switching part to the storage part and the pressure loss in the flow path from the flow path switching part to the measurement part are the same, the flow rate of the fluid flowing through the distribution flow path and the flow rate of the fluid flowing through the measurement part introduction path can be made the same between before and after the switching by the flow path switching part. In doing so, an error in a flow rate measured by the measurement part can be reduced, and therefore the accuracy of the test target flowmeter can be accurately tested.

As a specific example adapted to make the pressure loss in the flow path from the flow path switching part to the storage part and the pressure loss in the flow path from the flow path switching part to the measurement part the same, it is conceivable to make the flow path length and flow path diameter of the flow path from the flow path switching part to the storage part and the flow path length and flow path diameter of the flow path from the flow path switching part to the measurement part the same, respectively.

Such a piping configuration allows the pressure losses to be made the same, and the piping configuration itself can be simplified.

Also, as another specific example adapted to make the pressure loss in the flow path from the flow path switching part to the storage part and the pressure loss in the flow path from the flow path switching part to the measurement part the same, it is conceivable to provide the flow path from the flow path switching part to the storage part or the flow path from the flow path switching part to the measurement part with a pressure loss mechanism adapted to make the pressure losses in the flow paths the same. As the pressure loss mechanism, configurations such as one in which a flow path provided with the pressure loss mechanism is provided with a restriction part such as an orifice are conceivable.

As a specific embodiment of the flowmeter test system, one in which the storage part includes a main storage part and a sub-storage part; the distribution flow path includes a circulation path adapted to circulate the fluid between the main storage part and the test target flowmeter and a sub-storage part introduction path adapted to be connected to the circulation path and introduce the fluid into the sub-storage part; and the flow path switching part is one adapted to switch among the circulation path, the sub-storage part introduction path, and the measurement part introduction path is conceivable.

Note that the main storage part is intended for fluid circulation, and therefore has a larger volume than the sub-storage part. Since the main storage part has a larger volume as described, the downsizing of the flowmeter test system is likely to be constrained by arrangement, and therefore it is difficult to make a pressure loss in a flow path from the flow path switching part to the main storage part and the pressure loss in the flow path from the flow path switching part to the measurement part the same.

In order to preferably solve this problem, it is desirable that a pressure loss in a flow path from the flow path switching part to the sub-storage part and the pressure loss from the flow path switching part to the measurement part are the same.

As a specific example adapted to make the pressure loss in the flow path from the flow path switching part to the sub-storage part and the pressure loss in the flow path from the flow path switching part to the measurement part the same, as described above, it is conceivable to make the flow path length and flow path diameter of the flow path from the flow path switching part to the sub-storage part and the flow path length and flow path diameter of the flow path from the flow path switching part to the measurement part the same, respectively and provide the flow path from the flow path switching part to the sub-storage part or the flow path from the flow path switching part to the measurement part with a pressure loss mechanism adapted to make the pressure losses in the flow paths the same.

Also, desirably, the flowmeter test system of the present invention is one further including a control device adapted to control the flow path switching part, and the control device performs a first step of circulating the fluid through the circulation path, a second step of flowing the fluid through the sub-storage part introduction path, and a third step of flowing the fluid through the measurement part introduction path in this order.

Controlling the flow path switching part in this manner makes it possible to first circulate the fluid through the circulation path to stabilize the flow of the fluid, then flow the fluid through the sub-storage part introduction path to regulate the flow rate of the fluid to a desired flow rate, and finally flow the fluid through the measurement part introduction path to perform flow rate measurement by the measurement part. As a result, an error in a flow rate measured by the measurement part can be further reduced.

The main storage part is one intended to store the fluid flowing through the circulation path, whereas the sub-storage part is one intended to be use for flow rate regulation before introducing the fluid through the measurement part introduction path, and therefore the internal volume of the main storage part is larger than that of the sub-storage part.

For this reason, in order to prevent the fluid from overflowing from the sub-storage part, desirably, the flowmeter test system further includes a return flow path adapted to return the fluid stored in the sub-storage part to the main storage part, and the sub-storage part is provided in a position higher than the main storage part.

Such a configuration makes it possible to return the fluid stored in the sub-storage part to the main storage part without the need for other power.

In order to exhaust gas resulting from the vaporization of the fluid inside the main storage part to the outside and ensure the safety of the flowmeter test system, it is conceivable that the flowmeter test system is configured to include a main exhaust line adapted to exhaust the gas from the inside of the main storage part. In addition, in order to prevent the inside of the main storage part from being depressurized by exhausting the main storage part through the main exhaust line, it is conceivable that the flowmeter test system is configured to include a main pressure regulation line adapted to supply air to the inside of the main storage part for pressure regulation.

Further, in order to exhaust gas resulting from the vaporization of the fluid in a measurement part containing space containing the measurement part to the outside and secure the safety of the flowmeter test system, it is conceivable that the flowmeter test system is configured to include a sub-exhaust line adapted to exhaust the measurement part containing space containing the measurement part.

In that case, the measurement part containing space may be depressurized to cause a flow rate error of the fluid introduced into the measurement part.

In order to solve this problem, it is desirable that the inside of the sub-storage part is communicatively connected to the measurement part containing space.

In such a configuration, even when the measurement part containing space is depressurized through the sub-exhaust line, since the measurement part containing space and the internal space of the sub-storage part are communicatively connected, the internal space of the sub-storage part and the measurement part containing space are subjected to pressure regulation through the return flow path connected to the sub-storage part and thereby the pressure imbalance is eliminated, thus achieving a pressure balance.

When the flowmeter test system has a connection port to be connected with the test target flowmeter and is of a transportable type, the flowmeter test system can be moved to a place where the test target flowmeter is arranged, and the test target flowmeter can be tested.

Advantageous Effects of Invention

According to the present invention configured as described above, since the pressure loss in the flow path from the flow path switching part to the storage part and the pressure loss in the flow path from the flow path switching part to the measurement part are the same, an error in a flow rate measured by the measurement part can be reduced, and consequently the accuracy of the test target flowmeter can be accurately tested.

DESCRIPTION OF EMBODIMENTS

In the following, one embodiment of a flowmeter test system according to the present invention will be described with reference to the drawings.

<System Configuration>

A flowmeter test system 100 of the present embodiment is one adapted to test the accuracy of a Coriolis flowmeter X1 (hereinafter referred to as a test target flowmeter X1) used for, for example, a fuel consumption measurement system X for measuring the fuel consumption of an engine. In addition, the engine is connected to, for example, an engine dynamometer.

Figure 1:
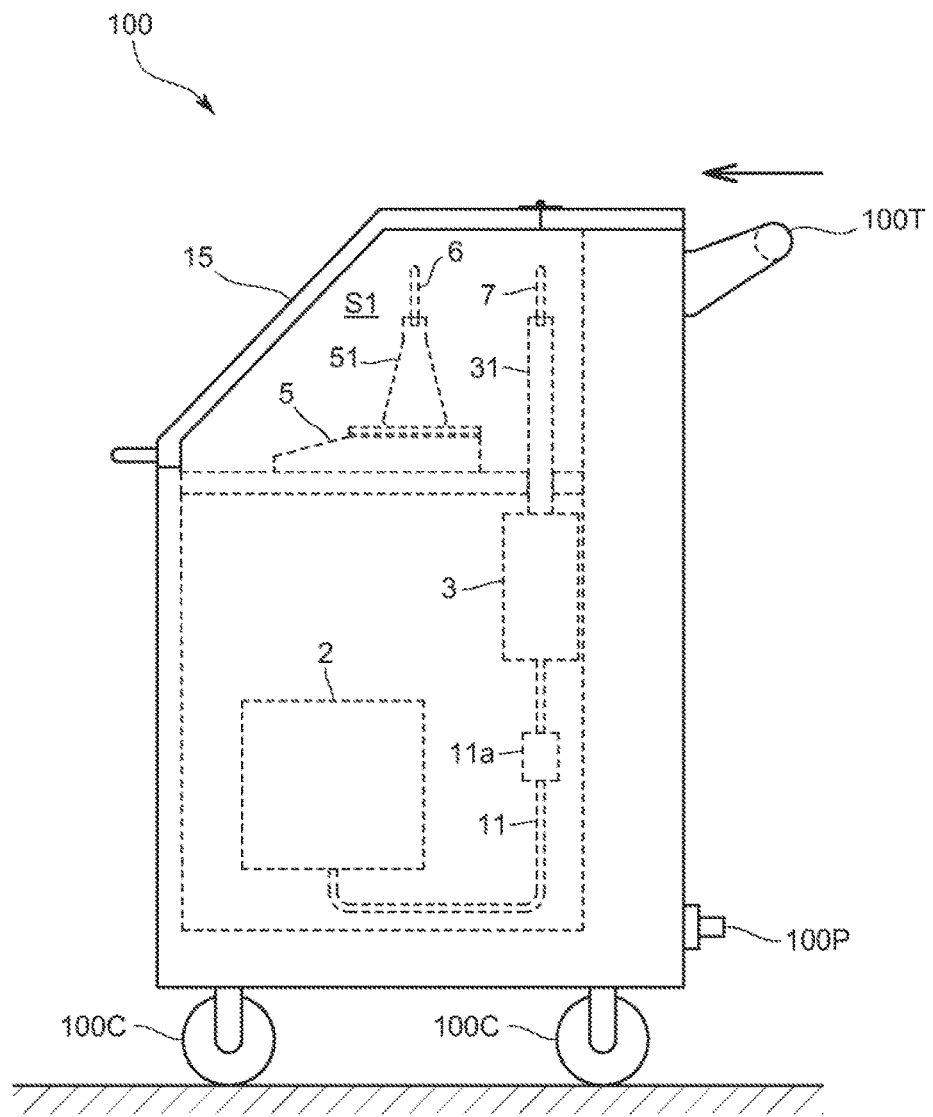
FIG. 1 is a side view illustrating the configuration of a flowmeter test system according to the present embodiment.

As illustrated in FIG. 1, the flowmeter test system 100 is a transportable one that has a connection port 100P to be connected with the test target flowmeter X1, and flows fuel through the test target flowmeter X1 as well as measuring the fuel having flowed through the test target flowmeter X1 by an electronic balance, which serves as a measurement part different from the test target flowmeter X1, to test the test target flowmeter X1. In addition, the flowmeter test system 100 of the present embodiment is configured to be movable with the aid of casters (wheels) 100C as well as having a handle 100T for enabling a moving operation. Note that the measurement part may be, in addition to the electronic balance that measures the mass of fluid, a reference flowmeter serving as a reference for the test target flowmeter, or a flowmeter having a measurement principle different from that of the test target flowmeter.

Figure 2:
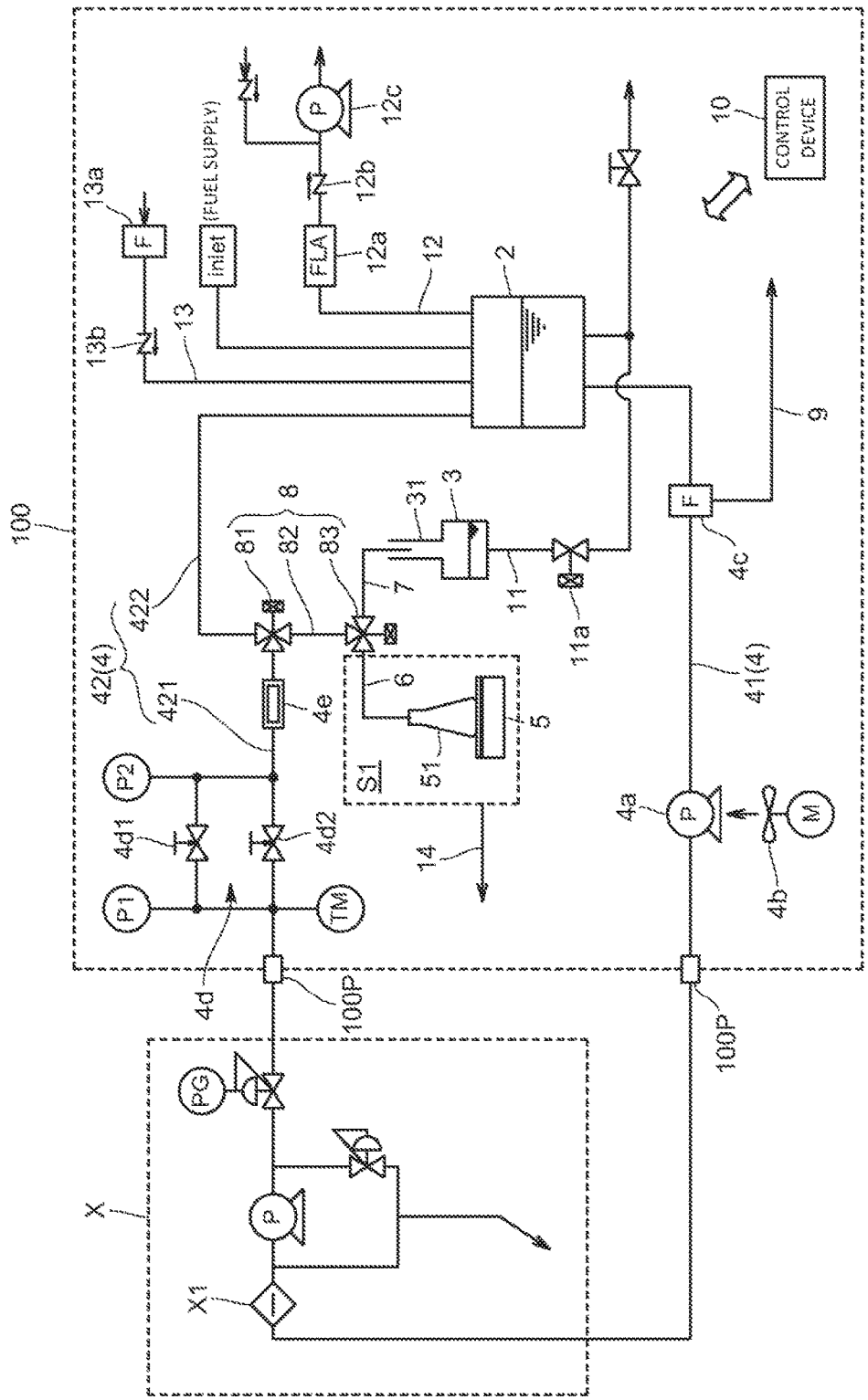
FIG. 2 is a schematic diagram illustrating the configuration of the flowmeter test system according to the same embodiment.

Specifically, as illustrated in FIG. 2, the flowmeter test system 100 includes: a main storage part 2 adapted to store the fuel; a sub-storage part 3 adapted to be provided separately from the main storage par 2 and temporarily store the fuel; a circulation path 4 adapted to circulate the fuel between the main storage part 2 and the test target flowmeter X1; an electronic balance introduction path (a measurement part introduction path) 6 adapted to be connected between a downstream side of the test target flowmeter X1 and an upstream side of the main storage part 2 in the circulation path 4 and introduce the fuel to the electronic balance 5; a sub-storage part introduction path 7 adapted to be connected between the downstream side of the test target flowmeter X1 and the upstream side of the main storage part 2 in the circulation path 4 and introduce the fuel into the sub-storage part 3; and a flow path switching part 8 adapted to selectively switches the flow of the fluid through the circulation path 4 between the electronic balance introduction path 6 and the sub-storage part introduction path 7. Note that the circulation path 4 and the sub-storage part introduction path 7 serve as a distribution flow path adapted to distribute the fluid between the storage part (the main storage part 2 and the sub-storage part 3) and the test target flowmeter X1.

The main storage part 2 and the sub-storage part 3 are tanks made of stainless steel such as SUS 316. The main storage part 2 is one intended to store the fluid flowing through the circulation path 4, whereas the sub-storage part 3 is one intended to be used for flow rate regulation before introducing the fluid into the electronic balance introduction path 6, and therefore the internal volume of the main storage part 2 is larger than that of the sub-storage part 3.

The circulation path 4 includes: an outward side piping part 41 that connects a fuel lead-out port of the main storage part 2 and a fuel introduction port of the test target flowmeter X1; and a return side piping part 42 that connects a fuel lead-out port of the test target flowmeter X1 and a fuel introduction port of the main storage part 2.

The outward side piping part 41 is provided with a circulation pump 4a for feeding out the fuel from the main storage part 2 to the test target flowmeter X1 to circulate the fuel. The circulation pump 4a is cooled by an oil proof fan 4b. Also, on the upstream side of the circulation pump 4a in the outward side piping part 41, a filter 4c for preventing impurities from being mixed into the circulation pump 4a is provided. Further, the outward side piping part 41 is connected through the filter 4c with a purging flow path 9 for purging the circulation path 4.

The return side piping part 42 is provided with a flow rate regulation part 4d for regulating a flow path. The flow rate regulating part 4d in the present embodiment includes needle valves, and is configured to arrange the two needle valves 4d1 and 4d2 having different flow rate regulation ranges (Cv values) in parallel. Also, the return side piping part 42 is provided with a sight glass 4e for checking the presence or absence of air bubbles inside the flow path. The sight glass 4e is provided in the uppermost part in the return side piping part 42.

In addition, the return side piping part 42 is provided with the electronic balance introduction path 6, sub-storage part introduction path 7, and flow path switching part 8.

Specifically, the flow path switching part 8 includes: a first three-way solenoid valve 81 provided in the return side piping part 42; an intermediate piping part 82 of which one end is connected to one port of the first three-way solenoid valve 81; and a second three-way solenoid valve 83 of which one port is connected to the other end of the intermediate piping part 82.

Another port of the first three-way solenoid valve 81 is connected with the upstream side pipe 421 of the return side piping part 42, and the other port is connected with the downstream side pipe 422 of the return side piping part 42. Also, another port of the second three-way solenoid valve 83 is connected with one end of the electronic balance introduction path 6, and the other port is connected with one end of the sub-storage part introduction path 7. The first three-way solenoid valve 81 and the second three-way solenoid valve 82 are controlled by a control device 10 to open/close.

Note that the flow path length and flow path diameter of the electronic balance introduction path 6 and the flow path length and flow path diameter of the sub-storage part introduction path 7 are configured to be the same, respectively. That is, the flow path length and flow path diameter of the flow path from the second three-way solenoid valve 83 to the electronic balance 5 and the flow path length and flow path diameter of the flow path from the second three-way solenoid valve 83 to the sub-storage part 3 are configured to be the same, respectively. Specifically, a pipe constituting the electronic balance introduction path 6 and a pipe constituting the sub-storage part introduction path 7 are configured to have the same flow path length and the same flow path diameter, and also configured to have substantially the same shape. Further, these pipes are made of the same material (stainless steel such as SUS 316).

Figure 3:
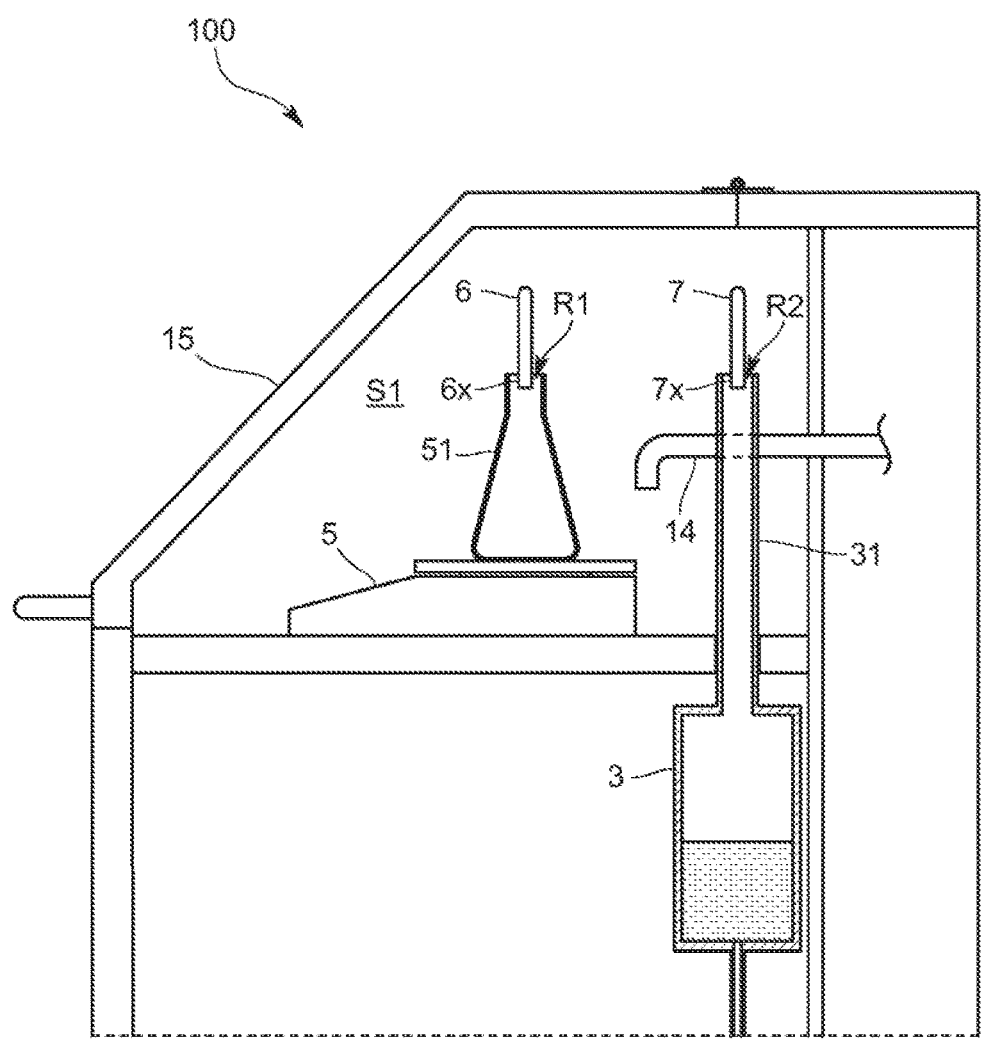
FIG. 3 is a schematic diagram illustrating an electronic balance containing space and its peripheral structure in the same embodiment.

As illustrated in FIG. 3, the electronic balance introduction path 6 is one for introducing the fuel into a measuring container 51 for the electronic balance 5, and a fluid lead-out part 6x of the electronic balance introduction path 6 is separated from the measuring container 51. Between the fluid lead-out part 6x and the upper opening of the measuring container 51, a gap is formed, and the gap serves as a communicative connection part R1 for communicatively connecting the fluid outlet of the electronic balance introduction path 6 to the outside of the measuring container 51.

Also, as illustrated in FIG. 3, the sub-storage part introduction path 7 is one for introducing the fuel into the sub-storage part 3, and the fluid lead-out part 7x of the sub-storage part introduction path 7 is separated from the sub-storage part 3. Between the fluid introduction part 7x and the upper opening of the sub-storage part 3, a gap is formed, and the gap serves as a communicative connection part R2 for communicatively connecting the fluid outlet of the sub-storage part introduction path 7 to the outside of the sub-storage part 3.

Such a configuration allows a pressure loss in the pipe constituting the electronic balance introduction path 6 and a pressure loss in the pipe constituting the sub-storage part introduction path 7 to be made substantially the same.

Note that the sub-storage part 3 is arranged below the electronic balance 5. As described above, the pipe constituting the electronic balance introduction path 6 and the pipe constituting the sub-storage part introduction path 7 have substantially the same shape, and therefore the upper opening of the sub-storage part 3 and the fluid lead-out part 7x of the sub-storage part introduction path 7 are vertically separated. For this reason, in the present embodiment, a receiving pipe 31 extending from the upper opening of the sub-storage part 3 toward the fluid lead-out part 7x of the sub-storage prat introduction path 7 is provided. The receiving pipe 31 is thicker than the pipe constituting the sub-storage part introduction path 7, and provided so as to surround the outer circumference of the pipe constituting the sub-storage part introduction path 7.

Further, in the present embodiment, as illustrated in FIGS. 1 and 2, a return flow path 11 for returning the fuel stored in the sub-storage part 3 to the main storage part 2 is provided, and the sub-storage part 3 is provided above the main storage part 2. One end of the return flow path 11 is connected to the bottom surface of the sub-storage part 3. The other end of the return flow path 11 is connected to the bottom surface of the main storage part 2 so as to prevent air bubbles from being produced when the fuel is returned to the main storage part 2. In addition, the other end of the return flow path 11 may be connected the side or upper wall of the main storage part 2. In addition, the return flow path 11 is provided with a two-way solenoid valve 11a, and configured to be opened or blocked. The two-way solenoid valve 11a is controlled by the control device 10 to open/close. Note that the sub-storage part 3 has a function of storing the fluid by closing the two-way solenoid valve 11a, but may have a function as a flow path that does not store the fluid when the two-way solenoid valve 11a is opened.

The height position of the sub-storage part 3 relative to the main storage part 2 is only required to be a height position allowing the fuel stored in the sub-storage part 3 to flow into the main storage part 2 on the basis of the principle of siphon, and the height of the bottom surface of the sub-storage part 3 is desirably higher than at least the liquid level of the fuel stored in the main storage part 2. In the present embodiment, in order to surely return the fuel stored in the sub-storage part 3 to the main storage part 2, the height of the bottom surface of the sub-storage part 3 is set to a position higher than the height of the upper surface of the main storage part 2.

In addition, as illustrated in FIG. 2, the flowmeter test system 100 of the present embodiment includes: a main exhaust line 12 adapted to exhaust gas from the inside of the main storage part 2; a main pressure regulation line 13 adapted to supply air to the inside of the main storage part 2; and a sub-exhaust line 14 adapted to exhaust an electronic balance containing space S1 containing the electronic balance 5.

The main exhaust line 12 is one adapted to exhaust fuel gas resulting from vaporization in the inside of the main storage part 2 to the outside, and configured to be connected to a centralized exhaust pipe together with the other exhaust lines for collectively exhausting gas. The main exhaust line 12 is provided with a flame arrester (a flashback arrester) 12a, check valve 12b, and exhaust pump 12c.

The main pressure regulation line 13 is one adapted to supply air from the outside so as to prevent the inside of the main storage part 2 from being depressurized, and provided with a dust filter 13a and a check valve 13b.

The sub-exhaust line 14 is one adapted to exhaust fuel gas resulting from vaporization in the electronic balance containing space S1 containing the electronic balance 5 to the outside, and configured to be connected to the centralized exhaust pipe together with the main exhaust line 12 for collectively exhausting gas. As with the main exhaust line 12, the sub-exhaust line 14 is also provided with a flame arrester (a flashback arrester), check valve, and exhaust pump although they are not illustrated.

As illustrated in FIG. 3, the electronic balance containing space S1 is configured to be openable/closable by a cover body 15, thus allowing the electronic balance 5 and/or the measuring container 51 to be replaced. When closing the cover body 15, the electronic balance containing space S1 becomes a closed space.

The electronic balance containing space S1 is communicatively connected to the internal space of the sub-storage part 3. In the present embodiment, the receiving pipe 31 of the sub-storage part 3 extends into the electronic balance containing space S1, and thereby the inside of the sub-storage part 3 is communicatively connected to the electronic balance containing space S1. Note that it may be configured to form a sub-storage part containing space, which is a closed space containing the sub-storage part 3, and communicatively connect the sub-storage part containing space and the electronic balance containing space S1 to thereby communicatively connect the electronic balance containing space S1 to the internal space of the sub-storage part 3 through the sub-storage prat containing space.

Figure 4:
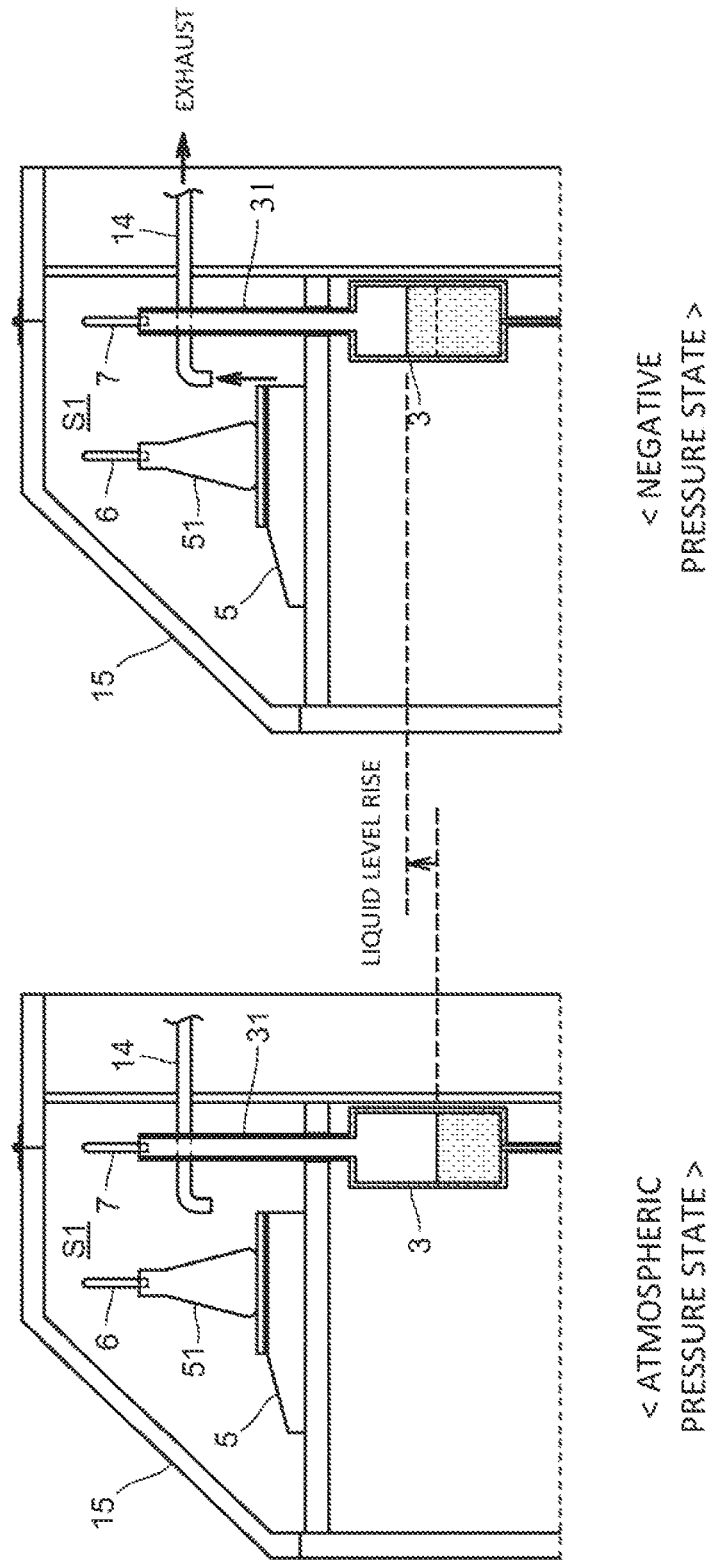
FIG. 4 is a schematic diagram illustrating a pressure regulation mechanism associated with exhausting the electronic balance containing space.

In such a configuration, as illustrated in FIG. 4, when exhausting the electronic balance containing space S1 through the sub-exhaust line 14, the electronic balance containing space S1 is depressurized; however, since the electronic balance containing space S1 and the internal space of the sub-storage part 3 are communicatively connected, the fuel flows into the sub-storage part 3 through the return flow path 11 connected to the sub-storage part 3, and the internal space of the sub-storage part 3 and the electronic balance containing space S1 are subjected to pressure regulation to thereby eliminate the pressure imbalance, thus achieving a pressure balance.

Next, the actions of the flowmeter test system 100 configured as described above will be described together with description of the functions of the control device 10.

Figure 5:
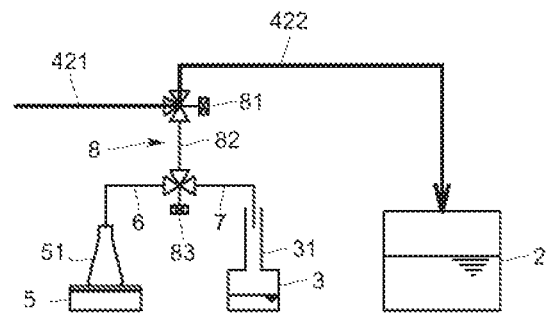
FIG. 5 is a schematic diagram illustrating three states of a flow path switching part in the same embodiment.
Figure 5:
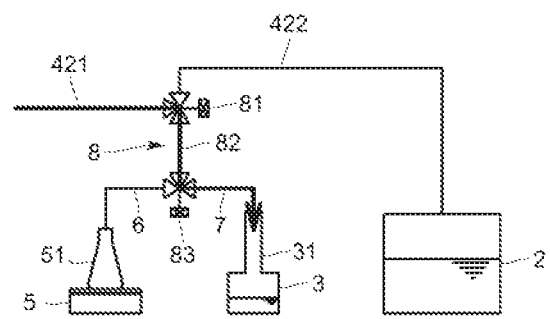
Figure 5:
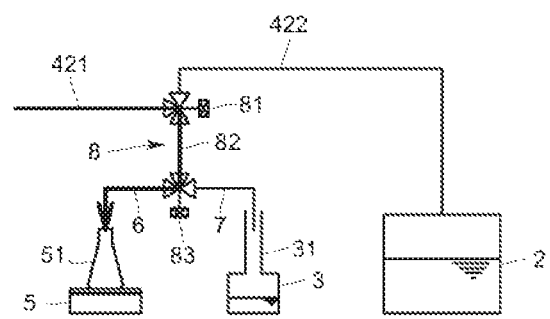

The control device 10 is one adapted to control the flow path switching part 8 and respective parts provided in other flow paths, and thereby as illustrated in FIG. 5, perform a first step of circulating the fuel through the circulation path 4, a second step of flowing the fuel through the sub-storage part introduction path 7, and a third step of flowing the fuel through the electronic balance introduction path 6 in this order.

<First Step>

First, when flowing the fuel through the circulation path 4 for circulation, the first three-way solenoid valve 81 is operated to communicatively connect the upstream side pipe 421 and the downstream side pipe 422 of the return side piping part 42, and the circulation pump 4*a* provided in the outward side piping part 41 is activated to flow the fuel through the circulation path 4.

<Second Step>

After a predetermined time has passed since the start of the fuel circulation through the circulation path 4, or after a measured flow rate value by the test target flowmeter X1 has been stabilized, the control device 10 makes the first three-way valve 81 communicatively connect the upstream side pipe 421 of the return side piping part 42 and the intermediate piping part 82, as well as making the second three-way solenoid valve 83 communicatively connect the intermediate piping part 82 and the sub-storage part introduction path 7. In this state, the needle valve 4*d*1 (or 4*d*2) provided in the upstream side pipe 421 of the return side piping part 42 is operated to regulate the measured flow rate value by the test target flowmeter X1 to a predetermined flow rate. In this state, the two-way solenoid valve 11*a* in the return path 11 may be opened or closed. In addition, while circulating the fuel through the circulation path 4, the needle valve 4*d*1 (or 4*d*2) may be operated to preliminarily regulate the measured flow rate value by the test target flowmeter X1 to the predetermined flow rate.

<Third Step>

Then, after the measured flow rate value by the test target flowmeter X1 has been stabilized, the control device 10 makes the second three-way solenoid valve 83 communicatively connect the intermediate piping part 82 and the electronic balance introduction path 6 to start flow rate measurement by the electronic balance 5. The control device 10 calculates a flow rate from mass obtained by introducing the fuel to the electronic balance 5 for a predetermined time, and compares the measured flow rate value obtained by the test target flowmeter X1 and the measured flow rate value obtained by the electronic balance 5 to determine whether or not the difference between the two measured flow rate values is within a reference range.

In the third step, the electronic balance containing space S1 is exhausted through the sub-exhaust line 14. Also, the two-way solenoid valve 11*a* in the return flow path 11 is in an opened state in order to regulate the pressure of the electronic balance containing space S1. Note that in the first and second steps, the two-way solenoid valve 11*a* is normally in a closed state, but may be in the opened state.

Also, the control device 10 performs the above-described test at multiple setting flow rates to determine the linearity of the test target flowmeter X1. Specifically, after the end of acquisition of a measured flow rate value by the test target flowmeter X1 and a measured flow rate value by the electronic balance 5 at the first setting flow rate, the control device 10 makes the second three-way solenoid valve 83 communicatively connect the intermediate piping part 82 and the sub-storage part introduction path 7. In this state, the needle valve 4*d*1 (or 4*d*2) provided in the upstream side pipe 421 of the return side piping part 42 is operated to regulate the measured flow rate value by the test target flowmeter X1 to the next setting flow rate. Then, at the second setting flow rate, the measured flow rate value by the test target flowmeter X1 and a measured flow rate value by the electronic balance 5 are acquired. By repeating such operations to perform the test at the multiple setting flow rates, the linearity of the test target flowmeter X1 is determined.

Effects of Present Embodiment

In the flowmeter test system 100 according to the present embodiment configured as described above, since the pressure loss in the flow path from the flow path switching part 8 to the sub-storage part 3 and the pressure loss in the flow path from the flow path switching part 8 to the electronic balance 5 are the same, the flow rate of the fluid flowing through the circulation path 4 and the flow rate of the fluid flowing through the electronic balance introduction path 6 can be made the same between before and after the switching by the flow path switching part 8. In doing so, an error in a flow rate measured by the electronic balance 5 can be reduced, and therefore the accuracy of the test target flowmeter X1 can be accurately tested.

In particular, since the present embodiment is adapted to provide the sub-storage part 3 separately from the main storage part 2 connected with the circulation path 4 and also provide the sub-storage part introduction path 7 for introducing the fluid into the sub-storage part 3, a configuration adapted to match the pressure loss in the sub-storage part introduction path 7 with the pressure loss in the electronic balance introduction path 6 can be easily designed without any constraint of arrangement design of the main storage part 2. In addition, the flow rate switching part 8 switches from the sub-storage part introduction path 7 to the electronic balance introduction path 6, and thereby as compared with when switching from the circulation path 4 to the electronic balance introduction path 6 as in the conventional manner, the difference in pressure loss can be reduced to substantially zero. In doing so, an error in a flow rate measured by the electronic balance can be reduced, and therefore the accuracy of the test target flowmeter X1 can be accurately tested.

Also, since the flow path length and flow path diameter of the flow path from the flow path switching part 8 to the sub-storage part 3 and the flow path length and flow path diameter of the flow path from the flow path switching part 8 to the electronic balance 5 are made the same, respectively, the pressure losses can be made the same because of such a piping configuration, and the piping configuration itself can be simplified.

Other Embodiments

Note that the present invention is not limited to the above-described embodiment.

For example, the flowmeter in the above-described embodiment is the Coriolis flowmeter, but may be a flowmeter based on another measurement principle, such as a thermal flowmeter, differential pressure flowmeter, or ultrasonic flowmeter.

Figure 6:
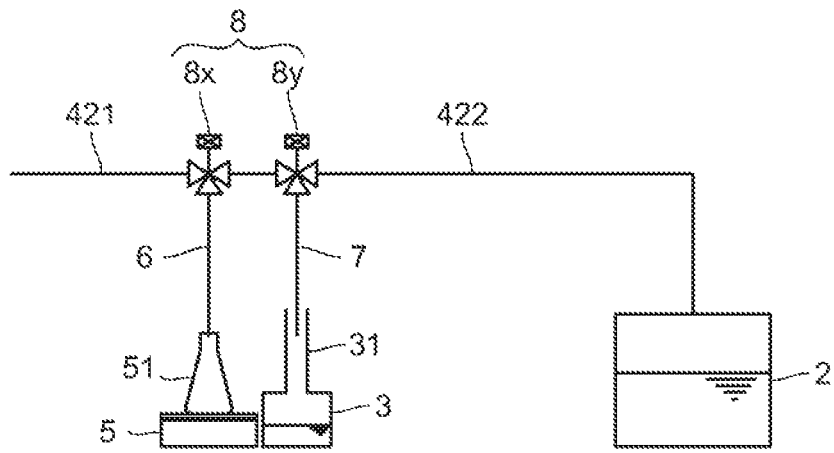
FIG. 6 is a schematic diagram illustrating the configurations of flow path switching mechanisms in variations.
Figure 6:
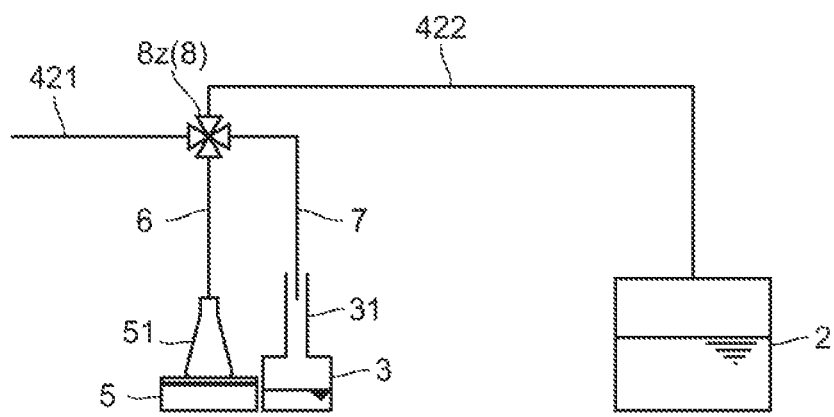

In addition, the flow path switching part 8 in the above-described embodiment is configured to connect the electronic balance introduction path 6 and the sub-storage part introduction path 7 to the one three-way solenoid valve (the second three-way solenoid valve 83) for the switching, but as illustrated in FIG. 6A, may be configured to connect the electronic balance introduction part 6 and the sub-storage part introduction path 7 to the circulation path 4 through three-way solenoid valves 8x and 8y, respectively. This configuration may increase the difference in pressure loss as compared with the above-described embodiment, but can reduce the difference in pressure loss as compared with when switching from the circulation path 4 to the electronic balance introduction path 6.

Further, as illustrated in FIG. 6B, it may be configured to connect the electronic balance introduction path 6 and the sub-storage part introduction path 7 to the circulation path 4 through a four-way solenoid valve 8z.

In addition, in order to minimize the difference between the temperature of the fuel flowing through the test target flowmeter and the temperature of the fuel to the electronic balance of the flowmeter test system (minimize the difference to 2 to 3° C.), a mechanism adapted to thermally insulate or temperature control at least the upstream side pipe 421 of the return side piping part 42 of the circulation path 4, the flow path switching part 8, and the electronic balance introduction path 6 may be provided.

As a configuration adapted to make the pressure loss in the flow path from the flow path switching part 8 to the sub-storage part 3 and the pressure loss in the flow path from the flow path switching part 8 to the electronic balance 5 the same, at least one of the flow paths may be provided with a pressure loss mechanism adapted to make the pressure losses in the flow paths the same. As the pressure loss mechanism, a configuration including a restriction part such as an orifice for restricting a flow path provided with the pressure loss mechanism, and a configuration including a fluid resistive element are conceivable.

Figure 7:
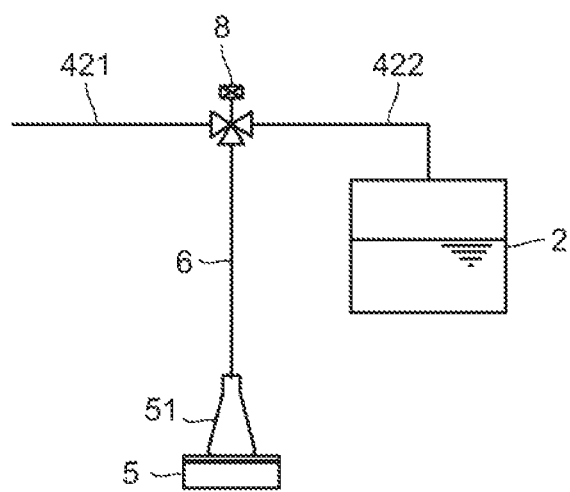
FIG. 7 is a schematic diagram illustrating a flow path configuration from a flow path switching mechanism to an electronic balance and to a storage part in a different variation.

In the above-described embodiment, the storage part is configured to be divided into the main storage part 2 and the sub-storage part 3, but as illustrated in FIG. 7, may be configured to include only one main storage part 2. In this case, the distribution flow path is configured not to have the sub-storage part introduction path 7, but to have only the circulation path 4. In addition, the electronic balance introduction path 6 is connected to the circulation path 4 through a three-way solenoid valve serving as the flow path switching part 8.

In this configuration, a pressure loss in a flow path from the flow path switching part 8 to the main storage prat 2 and a pressure loss in a flow path from the switching part 8 to the electronic balance 5 are made the same. FIG. 7 illustrates the case where the flow path length and flow path diameter of the flow path from the flow path switching part 8 to the main storage part 2 and the flow path length and flow path diameter of the flow path from the flow path switching part 8 to the electronic balance 5 are made the same, respectively.

Figure 8:
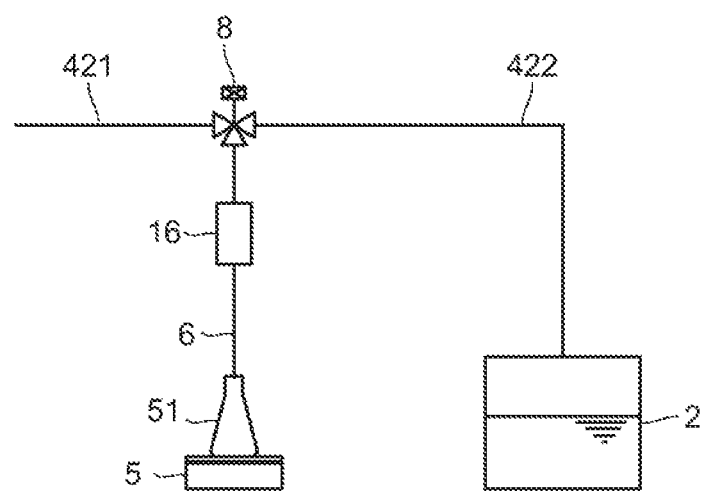
FIG. 8 is a schematic diagram illustrating a flow path configuration from the flow path switching part to the electronic balance and to the storage part in an alternative variation.

In cases such as when the flow path length and flow path diameter of the flow path from the flow path switching part 8 to the main storage part 2 and the flow path length and flow path diameter of the flow path from the flow path switching part 8 to the electronic balance 5 cannot be made the same, respectively, for some reasons such as piping design of the main storage part, as illustrated in FIG. 8, a pressure loss mechanism 16 adapted to make the pressure losses in the flow paths the same may be provided. As the pressure loss mechanism 16, a configuration including a restriction part such as an orifice for restricting a flow path provided with the pressure loss mechanism 16, and a configuration including a fluid resistive element are conceivable. In FIG. 8, the pressure loss mechanism 16 is provided in the flow path (the electronic balance introduction path 6) from the flow path switching part 8 to the electronic balance 5, but may be provided in the flow path from the flow path switching part 8 to the main storage part 2 (the downstream side pipe 422). Alternately, both the electronic balance introduction path 6 and the downstream side pipe 422 may be provided with pressure loss mechanisms, respectively.

Further, when a flow path length is longer or shorter, the pressure losses in the flow paths may be made the same by increasing or decreasing a corresponding flow path diameter.

Besides, it goes without saying that the present invention is not limited to any of the above-described embodiment and variations, but can be variously modified without departing from the scope thereof.

REFERENCE SIGNS LIST

100: Flowmeter test system
100P: Connection port
X1: Test target flowmeter
2: Main storage part
3: Sub-storage part
4: Distribution flow path
5: Electronic balance (measurement part)
51: Measuring container
6: Electronic balance introduction path (measurement part introduction path)
7: Sub-storage part introduction path
8: Flow path switching part
10: Control device
11: Return flow path
12: Main exhaust line
13: Main pressure regulation line
S1: Electronic balance containing space (measurement part containing space)
14: Sub-exhaust line
16: Pressure loss mechanism

The invention claimed is:

1. A flowmeter test system that tests a test target flowmeter by flowing fluid through the test target flowmeter and measuring the fluid having flowed through the test target flowmeter by a measurement part different from the test target flowmeter, the flowmeter test system comprising:
    a storage part, including a main storage part and a sub-storage part, configured to store fluid;
    a distribution flow path, including a circulation path configured to circulate the fluid between the main storage part and the test target flowmeter and a sub-storage part introduction path configured to be connected to the circulation path and introduce the fluid into the sub-storage part, configured to distribute the fluid between the storage part and the test target flowmeter;
    a measurement part introduction path configured to be connected to the distribution flow path and introduce the fluid into the measurement part; and
    a flow switching part configured to switch between the circulation path, the distribution flow path, the measurement part introduction path, and the sub-storage part introduction path, wherein
a pressure loss in a flow path from the flow path switching part to the storage part and a pressure loss in a flow path from the flow path switching part to the measurement part are the same.

2. The flowmeter test system according to claim 1, wherein a How path length and a flow path diameter of the flow path from the flow path switching part to the storage part and a flow path length and a flow path diameter of the flow path from the flow path switching part to the measurement part are the same, respectively.

3. The flowmeter test system according to claim 1, wherein the flow path from the flow path switching part to the storage part or the flow path from the flow path switching part to the measurement part is provided with a pressure loss mechanism configured to make the pressure losses in the flow paths the same.

4. The flowmeter test system according to claim 1, wherein a flow path length and a flow path diameter of the flow path from the flow path switching part to the sub-storage part and a flow path length and a flow path diameter of the flow path from the flow path switching part to the measurement part are the same, respectively.

5. The flowmeter test system according to claim 1, wherein
the flow path from the flow path switching part to the sub-storage part or the flow path from the flow path switching part to the measurement part is provided with a pressure loss mechanism configured to make the pressure losses in the flow paths the same.

6. The flowmeter test system according to claim 1, further comprising
a control device configured to control the flow path switching part, wherein
the control device is configured to sequentially perform operations of circulating the fluid through the circulation path, flowing the fluid through the sub-storage part introduction path, and flowing the fluid through the measurement part introduction path.

7. The flowmeter test system according to claim 1, further comprising
a return flow path configured to return the fluid stored in the sub-storage part to the main storage part, wherein the sub-storage part is provided in a position higher than the main storage part.

8. The flowmeter test system according to claim 7, further comprising:
a main exhaust line configured to exhaust gas from an inside of the main storage part;
a main pressure regulation line configured to supply air to the inside of the main storage part for pressure regulation; and
a sub-exhaust line configured to exhaust a measurement part containing space containing the measurement part, wherein
an inside of the sub-storage part is communicatively connected to the measurement part containing space.

9. The flowmeter test system according to claim 1, having a connection port connected with the test target flowmeter and being of a transportable type.

10. A flowmeter test method using a flowmeter test system that tests a test target flowmeter by flowing fluid through the test target flowmeter and measuring the fluid having flowed through the test target flowmeter by a measurement part different from the test target flowmeter, the flowmeter test system comprising a main storage part and a sub-storage part, both configured to store the fluid, a circulation path configured to distribute the fluid between the main storage part and the test target flowmeter a measurement part introduction path configured to be connected to the circulation path and introduce the fluid into the measurement part, a sub-storage part introduction path configured to be connected to the circulation path and introduce the fluid into the sub-storage part, and a flow path switching part configured to switch among the circulation path, the sub-storage part introduction path, and the measurement part introduction path, wherein a pressure loss in a flow path from the flow path switching part to the sub-storage part and a pressure loss in a flow path from the flow path switching part to the measurement part are same, the flowmeter test method comprising:
sequentially performing operations of
circulating the fluid through the circulation path;
flowing the fluid through the sub-storage art introduction path; and
flowing the fluid through the measurement part introduction path this order.

* * * * *